US012320327B2

(12) United States Patent
Broersma et al.

(10) Patent No.: US 12,320,327 B2
(45) Date of Patent: Jun. 3, 2025

(54) LIFT MODIFYING DEVICE FOR A ROTOR BLADE, ROTOR BLADE OF A WIND TURBINE AND METHOD FOR MODIFYING THE LIFT OF A ROTOR BLADE

(71) Applicant: Siemens Gamesa Renewable Energy A/S, Brande (DK)

(72) Inventors: Liekele Broersma, Vejle (DK); Peder Bay Enevoldsen, Vejle (DK); Alejandro Gomez Gonzalez, Aarhus (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/921,125

(22) PCT Filed: Apr. 27, 2021

(86) PCT No.: PCT/EP2021/060991
§ 371 (c)(1),
(2) Date: Oct. 25, 2022

(87) PCT Pub. No.: WO2021/224067
PCT Pub. Date: Nov. 11, 2021

(65) Prior Publication Data
US 2023/0175475 A1 Jun. 8, 2023

(30) Foreign Application Priority Data
May 5, 2020 (EP) .................................... 20172859

(51) Int. Cl.
*F03D 7/02* (2006.01)
*F03D 1/06* (2006.01)

(52) U.S. Cl.
CPC ........... *F03D 1/0675* (2013.01); *F03D 7/022* (2013.01); *F03D 7/0232* (2013.01);
(Continued)

(58) Field of Classification Search
None
See application file for complete search history.

(56) References Cited

U.S. PATENT DOCUMENTS 5,106,265 A 4/1992 Holzem
6,644,598 B2 * 11/2003 Glezer .................... B64C 23/00
244/200

(Continued)

FOREIGN PATENT DOCUMENTS

CN 105443313 A 3/2016
EP 1623111 B1 9/2008

(Continued)

OTHER PUBLICATIONS

International Search Report and Written Opinion for PCT/EP2021/060991 issued on Jul. 8, 2021.

*Primary Examiner* — Kayla Mccaffrey
(74) *Attorney, Agent, or Firm* — Schmeiser, Olsen & Watts LLP

(57) ABSTRACT

A lift modifying device for a rotor blade of a wind turbine is provided, the lifting modifying device including at least one fluid jet module and at least one compressed fluid source, wherein the at least one fluid jet module includes multiple fluid jets, which are fluidically connected to the at least one compressed fluid source, the at least one fluid jet module is configured to be arranged at a suction side or a pressure side of an airfoil of the rotor blade, and the at least one fluid jet module is configured to generate a fluid curtain separating an air flow on the suction side or the pressure side of the airfoil, when the rotor blade is provided with the lift modifying device on its suction side or pressure side and the at least one compressed fluid source supplies compressed fluid to the at least one fluid jet module.

7 Claims, 3 Drawing Sheets

(52) U.S. Cl.
CPC ....... *F05B 2230/60* (2013.01); *F05B 2230/80* (2013.01); *F05B 2240/30* (2013.01); *F05B 2240/305* (2020.08); *F05B 2260/901* (2013.01)

(56) References Cited

U.S. PATENT DOCUMENTS

| | | | |
|---|---|---|---|
| 8,047,783 B2* | 11/2011 | Nies | F03D 80/55 416/1 |
| 8,267,653 B2* | 9/2012 | Nies | F03D 1/0633 416/41 |
| 8,616,846 B2* | 12/2013 | Nanukuttan | F03D 1/0633 416/231 A |
| 8,851,840 B2 | 10/2014 | Hancock et al. | |
| 10,240,579 B2* | 3/2019 | Saddoughi | F03D 1/0658 |
| 2003/0091436 A1* | 5/2003 | Stiesdal | F03D 1/0641 416/1 |
| 2006/0140760 A1* | 6/2006 | Saddoughi | F03D 1/0608 416/23 |
| 2007/0231151 A1* | 10/2007 | Herr | F03D 7/022 416/229 A |
| 2010/0104436 A1 | 4/2010 | Herr et al. | |
| 2010/0127129 A1 | 5/2010 | Zha | |
| 2011/0018268 A1* | 1/2011 | Snel | F03D 7/022 290/44 |
| 2011/0103950 A1* | 5/2011 | Pesetsky | F03D 15/05 416/31 |
| 2011/0110777 A1* | 5/2011 | Abdallah | F03D 7/0252 416/23 |
| 2011/0142595 A1* | 6/2011 | Santiago | F03D 1/0675 416/235 |
| 2012/0134812 A1 | 5/2012 | Nanukuttan et al. | |
| 2014/0301864 A1* | 10/2014 | Singh | F03D 1/0675 416/90 R |
| 2016/0084223 A1 | 3/2016 | Gonzalez et al. | |

FOREIGN PATENT DOCUMENTS

| | | |
|---|---|---|
| EP | 2 122 164 A1 | 11/2009 |
| EP | 2 253 838 A1 | 11/2010 |
| EP | 2664791 A2 | 11/2013 |
| EP | 2784301 A1 | 10/2014 |
| EP | 2998571 A1 | 3/2016 |
| EP | 3115596 A1 | 1/2017 |
| WO | 2007114698 A2 | 10/2007 |
| WO | 2008/080407 A1 | 7/2008 |
| WO | WO 2018041420 A1 | 3/2018 |

* cited by examiner

LIFT MODIFYING DEVICE FOR A ROTOR BLADE, ROTOR BLADE OF A WIND TURBINE AND METHOD FOR MODIFYING THE LIFT OF A ROTOR BLADE

CROSS-REFERENCE TO RELATED APPLICATIONS

This application claims priority to PCT Application No. PCT/EP2021/060991, having a filing date of Apr. 27, 2021, which claims priority to EP Application No. 20172859.9, having a filing date of May 5, 2020, the entire contents both of which are hereby incorporated by reference.

FIELD OF TECHNOLOGY

The following relates to a lift modifying device for a rotor blade of a wind turbine, a rotor blade of a wind turbine and a method for modifying the lift of a rotor blade.

BACKGROUND

Several different types of flow regulating devices such as lift modifying devices are or can be used in wind turbines. Different desired aerodynamic characteristics may be achieved by the flow regulating devices in order to aim at a given goal, e.g., to increase or decrease lift of the rotor blades.

EP 3115596 A1 discloses a passive lift modifying device for reducing the lift coefficient of a rotor blade for a wind turbine, which is simple and efficient. This device is of a passive type and has the benefit of not requiring an external energy supply in order to function.

Other lift modifying devices are of an active type, wherein external energy is supplied to activate the lift modification by the device. Such a device is known from EP 2998571 A1, for example, and has the benefit that the aerodynamic characteristics of the rotor blade can be actively controlled.

SUMMARY

An aspect relates to a lift modifying device for a rotor blade of a wind turbine, a corresponding rotor blade and a corresponding method for modifying the lift of a rotor blade.

Thereby, the features and details described in connection with the lift modifying device of embodiments of the invention apply in connection with the rotor blade and the method for modifying the lift of a rotor blade, so that regarding the disclosure of the individual aspects it is or can be referred to one another.

According to a first aspect of embodiments of the invention, the problem is solved by a lift modifying device for a rotor blade of a wind turbine, the lifting modifying device comprising at least one fluid jet module and at least one compressed fluid source, wherein the at least one fluid jet module comprises multiple fluid jets, which are fluidically connected to the at least one compressed fluid source, the at least one fluid jet module is configured to be arranged at a suction side or a pressure side of an airfoil of the rotor blade, and the at least one fluid jet module is configured to generate a fluid curtain separating an air flow on the suction side or the pressure side of the airfoil, when the rotor blade is provided with the lift modifying device on the suction side of the pressure side and the at least one compressed fluid source supplies compressed fluid to the at least one fluid jet module.

The lift modifying device according to the first aspect of embodiments of the invention is of an active type. When the lift modifying device is activated, i.e., compressed fluid is supplied from the at least one compressed fluid source to the multiple fluid jets, the multiple fluid jets stream out the compressed fluid on the suction side or pressure side of the airfoil of the rotor blade, thereby generating the fluid curtain separating the air flow on the suction side or pressure side. Consequently, the lift coefficient is decreased, and the drag coefficient is increased. The air flow around the airfoil becomes stalled and the aerodynamic loads due to lift are reduced, while the aerodynamic loads due to drag are increased. The lift modifying device may be activated in operational or environmental conditions of the wind turbine benefiting from these lower lift loads and higher drag loads such as shutdown procedures, extreme gusts or turbulence, and pitch actuation, for example. However, when the lift modifying device is not activated, i.e., is deactivated, no compressed fluid is supplied to the multiple fluid jets, and the lift coefficient and the drag coefficient are not influenced by the lift modifying device. Thereby, a high lift coefficient and low drag coefficient, e.g., due to the design of the rotor blade, may be maintained in normal operation of the wind turbine, i.e., without presence of the operational or environmental conditions mentioned above, such that it may be operated in an efficient manner.

The rotor blade can be provided with the lift modifying device on the suction side or the pressure side of its airfoil. The at least one compressed fluid source must be operating, i.e., supply compressed fluid to the at least one fluid jet module, for the lift of the rotor blade to be modified.

In contrary to most of the current solutions in the state of the art, which are focusing on the enhancement of the aerodynamics of the airfoil, the proposed solution provides for separating or, in other words, destroying the air flow around the airfoil of the rotor blade, thereby reducing the lift coefficient and increasing the drag coefficient at the same time. The separation of the air flow around the airfoil, which may also be referred to as a main flow, is achieved by the actively generated fluid curtain on the suction side of the rotor blade. For this purpose, the at least one fluid jet module of the lift modifying device is configured to be arranged at the suction side or the pressure side of the airfoil of the rotor blade. The further components of the lift modifying device may in particular be configured to be arranged inside of the rotor blade and/or the wind turbine.

In some particular situations, such as certain types of emergency shutdowns, it may be beneficial to place the lift modifying device on the pressure side of the airfoil instead of the suction side of the airfoil.

The fluid jets are in particular configured for communication with the surroundings of the airfoil. The fluid jets are in particular directed into a direction out of the airfoil. The compressed fluid is exerted into the surrounds of the airfoil on the suction side or pressure side of the airfoil as the fluid curtain. The fluid curtain may be described as a stream of compressed fluid streaming out from the multiple fluid jets. It may be provided that various, most or all of the multiple fluid jets are aligned linearly or substantially linearly. Thereby, the fluid curtain may be generated along a straight or substantially straight line to separate the air flow on the suction side or pressure side of the rotor blade by a straight or substantially straight fluid curtain.

The at least one compressed fluid source provides compressed fluid, which may be under a pressure that is greater than atmospheric pressure. The compressed fluid source may be configured to supply compressed fluid with at least 200 kPa, in particular at least 1000 kPa. Accordingly, the compressed fluid may be supplied at that pressure. However, the pressure at the fluid jets may be lower since pressure may be lost on the way there.

It may be provided that the at least one compressed fluid source is a compressed air source. The compressor air source allows for efficient generation of compressed fluid and high compression, thereby generating a fluid curtain of high momentum. In particular, the compressed fluid source may be at least one of a compressor, a blower, a turbo-charger, or a piston with an air bag. The fluid may be a gas. Further, the fluid may in particular be air, nitrogen or any other inert gas. The air may be dry air or atmospheric air.

It may be provided that the multiple fluid jets in the at least one fluid jet module are provided as orifices fluidically connected to the at least one compressed fluid source. The orifices are easy to manufacture and thereby reduce the manufacturing cost of the lift modifying device. Alternatively, or additionally, the fluid jets or orifices may be placed at different locations with respect to the rotor blade. Thereby, the position of the fluid curtain on the suction side may be adjusted and the location of separation of the air flow around the airfoil may be shifted.

It may further be provided that the at least one fluid jet module comprises a curved outer shape on its outer side. The curved outer shape may correspond to the airfoil shape of the rotor blade. Thereby, an aerodynamic design may be achieved, when the at least one fluid jet module is arranged at the suction side or pressure side of the rotor blade.

Also, it may be provided that the at least one fluid jet module comprises an elongate body forming a fluid flow channel fluidically communicating with the multiple fluid jets. The fluid flow channel may be fluidically connected to the at least one compressed fluid source via at least one fluid supply line. Thereby, the fluid flow channel transports the compressed fluid from the at least one compressed fluid source to the multiple fluid jets. The elongate body may be configured to be arranged at the suction side of the airfoil of the rotor blade in the spanwise direction of the rotor blade.

Further, it may be provided that the at least one fluid jet module is at least two fluid jet modules, wherein each of the at least two fluid jet modules comprise multiple fluid jets. Thereby, greater flexibility of the lift modifying device with regard to its installation in the rotor blade is provided. For example, the multiple fluid jet modules may be arranged at a distance from one another, whereby a larger span along the rotor blade is provided without the necessity of providing fluid jets along the entire length of that span. Thereby, the effect of modifying the lift may nonetheless be achieved but at lower manufacturing costs and with less need of pressurized fluid flow rates.

Therein, it may be provided that each of the at least two fluid jet modules are connected to the at least one compressed fluid source by a valve and/or each of the at least two fluid jet modules is connected to a separate one of the at least one compressed fluid source. By the valve, the supply of compressed fluid from the at least one compressed fluid source may be controlled such that individual ones of the at least two fluid jet modules may be activated, i.e., supplied with compressed fluid to generate the fluid curtain, and others may be deactivated, i.e., not supplied with compressed fluid, whereby they do not generate the fluid curtain. When there are separate compressed fluid sources, i.e., at least two, to which the fluid jet modules are connected, the separate compressed fluid sources may be controlled by their operation, i.e., on or off, to activate or deactivate the fluid jet modules fluidically connected thereto. Thereby, the size and location of the fluid curtain along the span of the rotor blade may be adjusted allowing modification of the lift as currently required in certain operational or environmental situations.

Further, therein it may be provided, that each of the at least two fluid jet modules are connected by a separate fluid supply line to the at least one compressed fluid source. This further enables separate activation of the fluid jet modules by the at least one compressed fluid source.

Moreover, it may be provided that the lift modifying device comprises a control unit connected to the at least one compressed fluid source and/or at least one valve arranged in between the at least one fluid jet module and the at least one compressed fluid source, wherein the control unit is configured for varying the momentum of compressed fluid exiting the multiple fluid jets by controlling the at least one compressed fluid source and/or the at least one valve. In particular, the control unit may be configured to adjust the momentum of the compressed fluid exiting the fluid jets as currently required in certain operational or environmental situations, e.g., by turning on and off the at least one compressed fluid source or varying the pressure of the compressed fluid from the compressed fluid source.

Therein, it may be provided that the control unit is configured to operate the at least one compressed fluid source and/or alternatingly close and open the at least one valve such that the compressed fluid exits the multiple fluid jets as compressed fluid pulses. The operation of the compressed fluid source may be such that it is alternatingly turned on and off, or the compression of fluid or the output of the compressed fluid source is alternatingly increased and decreased. The compressed fluid pulses are pulses of compressed fluid exiting the multiple fluid jets. In other words, the pulses are a sequence of a distinct amount of compressed fluid exiting the multiple fluid jets following no or less compressed fluid exiting the multiple fluid jets and repetition of this sequence. Such method of operation may in particular be favorable to mitigate asymmetric loads of the rotor of the wind turbine, for example during operation in yawed inflow conditions, when balancing tilt loads of the main bearing of the wind turbine and in fault scenarios, e.g., where one blade is stuck due to a faulty pitch system.

According to a second aspect of embodiments of the invention, the problem is solved by a rotor blade of a wind turbine comprising the lift modifying device according to the first aspect of embodiments of the invention, whereby the at least one fluid jet module of the lift modifying device is provided on the suction side of the rotor blade.

It may be provided that the at least one fluid jet module is embedded in the rotor blade. This means that the at least one fluid jet module is not simply attached to an outside of the rotor blade but integrated at least partially, in particular entirely into the rotor blade, in particular its shell. The rotor blade, in particular its shell, may for this purpose comprise a recess corresponding in shape to the at least one fluid jet module. The fluid jet module may be attached to the rotor blade by form-fit and/or an adhesive, for example.

Further, it may be provided that the at least one fluid jet module is provided flush with the airfoil or shell of the rotor blade. Thereby, the aerodynamic properties, in particular the lift and drag coefficients, of the rotor blade are maintained when the lift modifying device is not activated.

Also, it may be provided that at least one fluid supply line fluidically connecting the at least one fluid jet module with the at least one compressed fluid source is at least partially arranged in an inside of the rotor blade, and attached to a spar web of the rotor blade. Further, any further components of the lift modifying device, such as the compressed fluid source or valves, may be arranged within the rotor blade.

Moreover, it may be provided that the rotor blade comprises multiple vortex generators. The vortex generators may in particular be arranged on the suction side of the rotor blade. The vortex generators may, for example, be arranged in between the at least one fluid jet module and the trailing edge of the rotor blade. The vortex generators increase the lift coefficient of the rotor blade in normal operation of the rotor blade. However, when operational or environmental conditions require, the lift coefficient may be efficiently reduced by the lift modifying device. Because opposing effects are achieved by the vortex generators and the lift modifying device, this measure may seem odd. However, due to the lift modifying device being of an active type, the vortex generators may be used to increase the efficiency of the wind turbine and at the same time the reduced loads may still be achieved in the required situations by activating the lift modifying device.

According to a third aspect of embodiments of the invention, the problem is solved by a method for modifying the lift of a rotor blade according to the second aspect of embodiments of the invention, whereby the at least one compressed fluid source is being operated to generate a fluid curtain on the suction side of the airfoil of the rotor blade, thereby separating the air flow on the suction side or the pressure side of the airfoil and reducing the lift coefficient and increasing the drag coefficient of the rotor blade.

The method may further include varying the momentum of compressed fluid exiting the multiple fluid jets. Also, the method may further include that the compressed fluid exits the multiple fluid jets as compressed fluid pulses. These steps may be achieved by the means described above.

BRIEF DESCRIPTION

Some of the embodiments will be described in detail, with reference to the following figures, wherein like designations denote like members, wherein.

DETAILED DESCRIPTION

Figure 1:
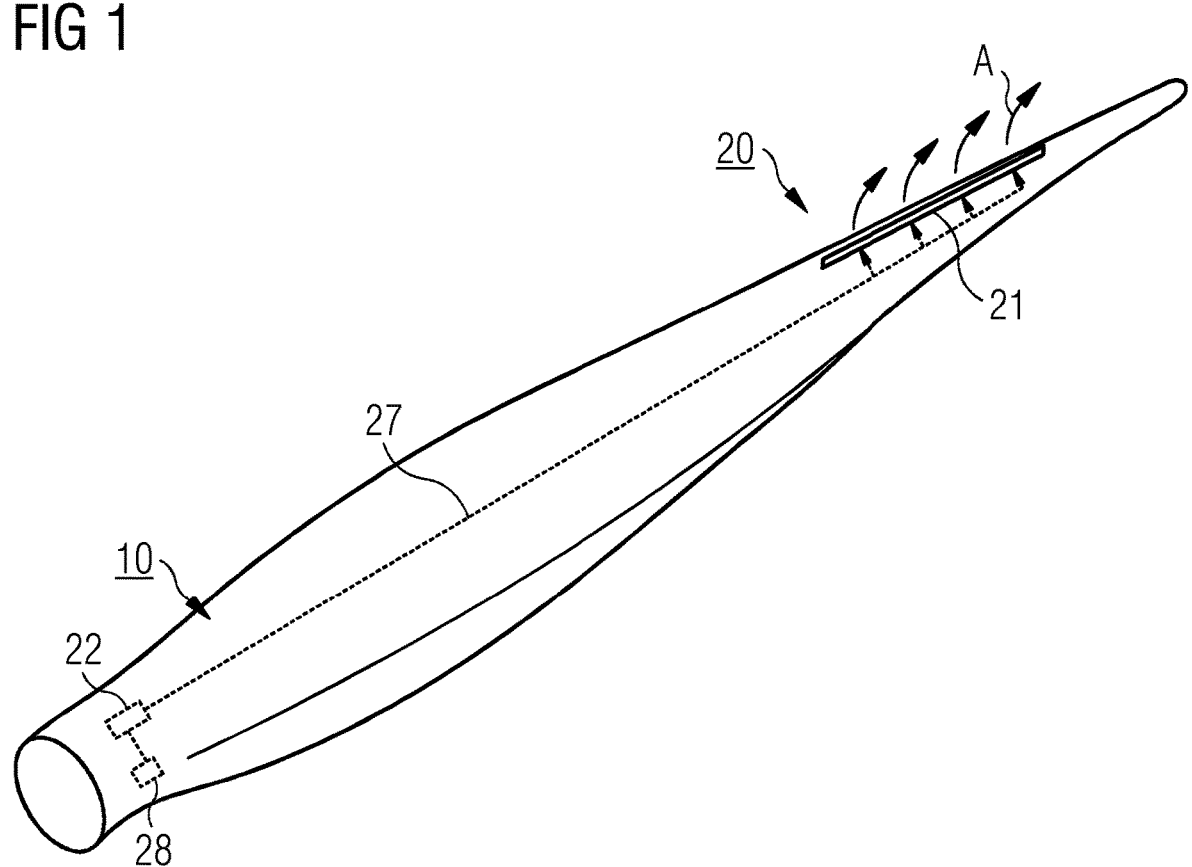
FIG. 1 shows a side perspective view on a rotor blade according to a first embodiment of the invention.

FIG. 1 shows a side perspective view on a rotor blade 10 according to an embodiment of the invention. The rotor blade 10 comprises a lift modifying device 20 according to an embodiment of the invention and installed therein.

The lift modifying device 20 comprises a fluid jet module 21. The lift modifying device 20 as shown in FIG. 1 is activated and thus generates a fluid curtain A. The fluid jet module 21 is arranged at a suction side 17 of the rotor blade 10, closer to the leading edge 15 of the rotor blade 10 than to the trailing edge 16 of the rotor blade 10. Further, the fluid jet module 21 is provided closer to the tip of the rotor blade 10 than to its root. However, the fluid jet module 21 may alternatively be placed closer to the trailing edge 16 or the root, if required. Also, alternatively, the fluid jet module 21 may be arranged on a pressure side of the rotor blade 10. The pressure side is located opposite of the suction side 17 at the rotor blade 10.

The fluid jet module 21 is exposed to the outside of the rotor blade 10 while the further components of the lift modifying device 20, namely a fluid supply line 27, a compressed fluid source 22 and a control unit 28, are located inside of the rotor blade 10. However, the control unit 28 may alternatively be located in the hub of the wind turbine, for example. Thus, the fluid supply line 27, compressed fluid source 22 and control unit 28 are drawn with dashed lines. The location of the compressed fluid source 22 and the control unit 28 are only exemplary, these components may also be located inside the wind turbine having the rotor blade 10. Also, the compressed fluid source 22 may be located directly at or close to the fluid jet module 21. The compressed fluid source 22 is configured to provide compressed fluid to the fluid jet module 21 via the fluid supply line 27. Here, the compressed fluid source 22 is a compressor and the fluid is air. However, other fluids may be used and other types of compressed fluid sources 22 may be used.

Figure 2:
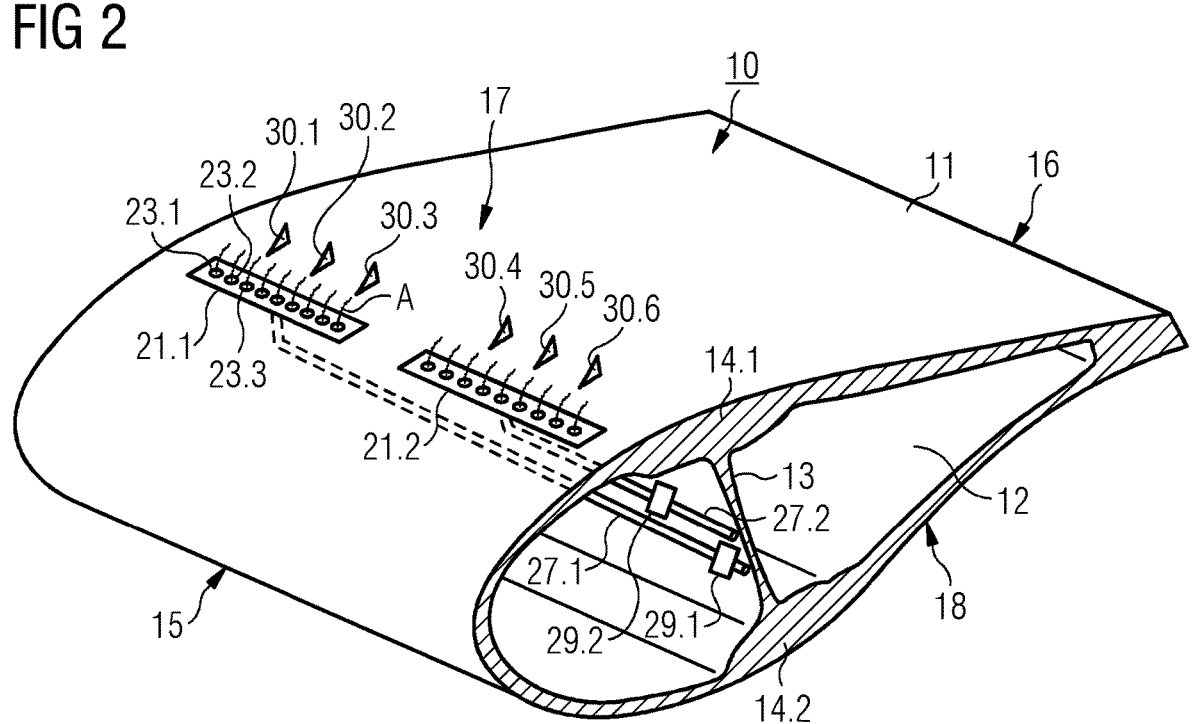
FIG. 2 shows a side perspective view on a section of a rotor blade according to a second embodiment of the invention.

FIG. 2 shows a side perspective view on a section of a rotor blade 10 according to a second embodiment of the invention. In this second embodiment, the lift modifying device 20 comprises two separate fluid jet modules 21.1, 21.2. However, the number of fluid jet modules 21 may be less or more. The fluid jet modules 21.1, 21.2 are arranged on the suction side 17 of the rotor blade 10 and closer to the leading edge 15 than the trailing edge 16. However, the fluid jet modules 21.1, 21.2 may alternatively be arranged closer to the trailing edge 16 than the leading edge 15.

Each of the fluid jet modules 21.1, 21.2 comprises multiple fluid jets 23. The fluid jets 23.1, 23.2, 23.3 of the fluid jet module 21.1 are exemplary denominated. In this case, the fluid jets 23 are provided as orifices within the fluid jet modules 21.1, 21.2. The fluid jets 23 are linearly aligned to generate a substantially straight fluid curtain A as shown in FIG. 1.

Moreover, the fluid jet modules 21.1, 21.2 are arranged at a distance from one another. However, they may alternatively be arranged next to one another.

Each of the fluid jet modules 21.1, 21.2 is fluidically connected via separate fluid supply lines 27.1, 27.2 to the compressed fluid source 22 (not shown in FIG. 2). Alternatively, each of the fluid jet modules 21.1, 21.2 may be connected to a separate one of multiple compressed fluid sources 22 (not depicted in FIG. 2).

Each of the fluid supply lines 27.1, 27.2 has a valve 29.1, 29.2 installed therein. The valves 29.1, 29.2 are connected to the control unit 28 (not shown in FIG. 2). By controlling the valves 29.1, 29.2, the control unit 28 may close or open the separate fluid supply lines 27.1, 27.2 and selectively activate the fluid jet modules 21.1, 21.2. Alternatively, the two valves 29.1, 29.2 may be a three-way-valve 29 and the fluid supply lines 27.1, 27.2 may merge at the three-way-valve 29. Also, when there are more than two fluid jet modules 21.1, 21.2 there may be more fluid supply lines 27 and more valves 29. The hydraulic circuitry of the fluid jet modules 21 with the compressed fluid source 22 depends on the particular installation and there are many possible circuitries for providing selective activation of separate fluid jet modules 21.1, 21.2 by the control unit 28. FIG. 2 merely illustrates an exemplary embodiment for explaining the principles thereof The fluid supply lines 27.1, 27.2 are arranged in the inside 12 of the rotor blade 10. They are attached as an example to a spar web 13 of a spar of the rotor blade 10. The spar in this embodiment is of an I-beam type having two spar caps 14.1, 14.2. However, the spar may be also of any other type, such as a box type spar. Also, alternatively, the fluid supply lines 27.1, 27.2 may be attached to an interior side of the shell 11 of the rotor blade 10.

Further to the lift modifying device 20, the rotor blade 10 is provided with multiple vortex generators 30.1, 30.2, 30.3, 30.4, 30.5, 30.6, six of which are exemplary shown and denominated. The vortex generators 30 are attached to the suction side 17 of the rotor blade 10 and increase the lift coefficient.

Figure 3:
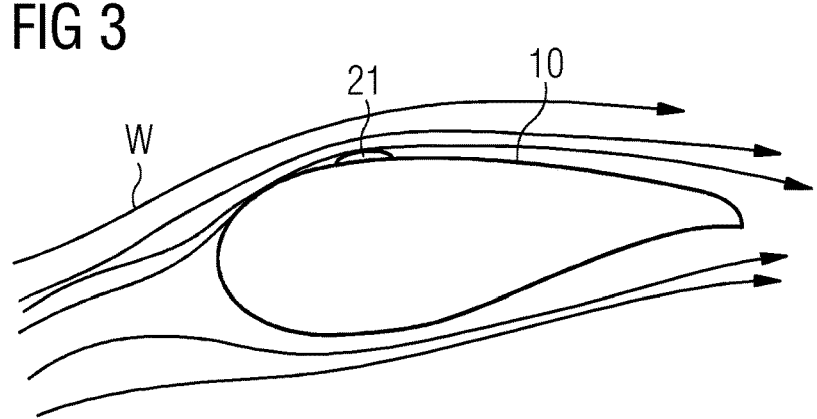
FIG. 3 shows a side view on the rotor blade of FIG. 1 in operation and with the lift modifying device being deactivated.

FIG. 3 shows a side view on the rotor blade 10 of FIG. 1 in operation and with the lift modifying device 20 being deactivated. Here, the air flow W around the airfoil of the rotor blade 10 is not separated by the fluid jet module 21 of the lift modifying device 20. Thereby, the flow W is an attached air flow around the airfoil.

Figure 4:
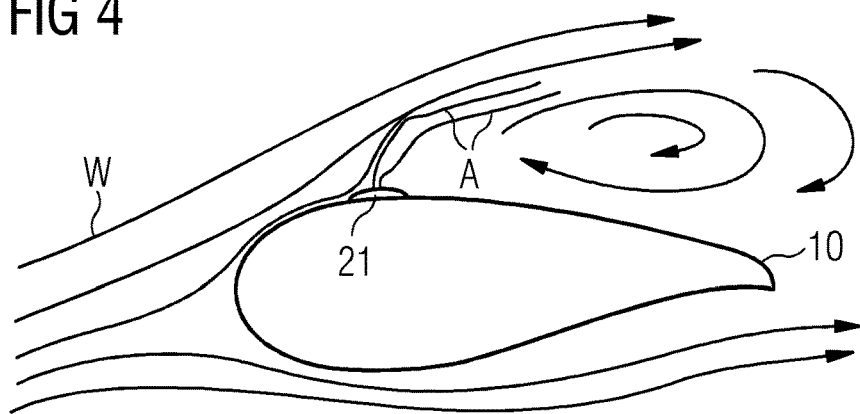
FIG. 4 shows a side view on the rotor blade of FIG. 1 in operation and with the lift modifying device being activated.

FIG. 4 shows a side view on the rotor blade of FIG. 1 in operation and with the lift modifying device 20 being activated. The fluid jet module 21 generates a fluid curtain A and thereby separates the air flow W at the fluid curtain A. The air flow W becomes a separated air flow after the fluid jet module 21 and creates a stalled flow. The lift coefficient of the rotor blade 10 is reduced and the drag coefficient of the rotor blade 10 is at the same time increased.

Figure 5:
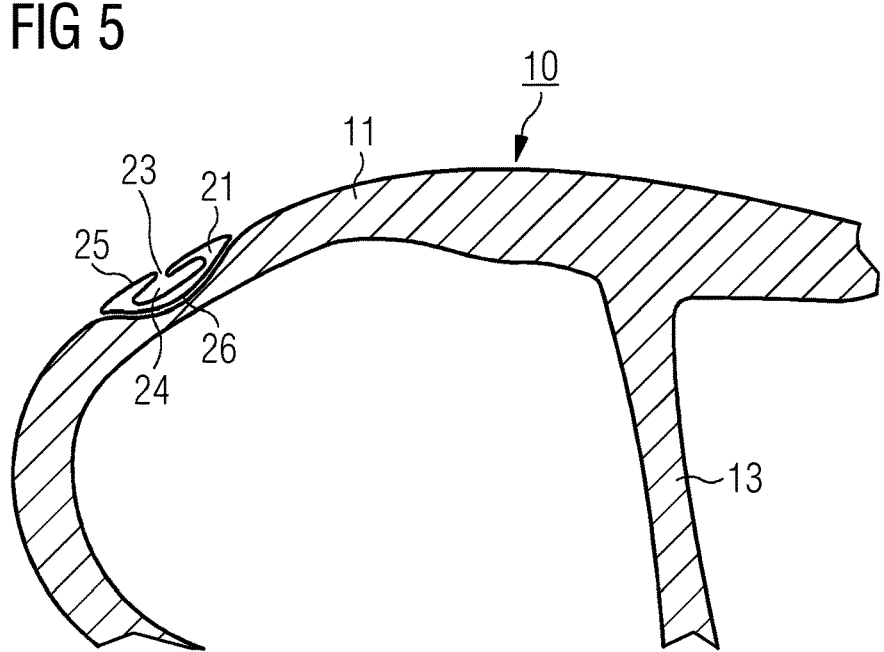
FIG. 5 shows a sectional cut through a portion of a rotor blade according to a third embodiment of the invention.

FIG. 5 shows a sectional cut through a portion of a rotor blade 10 according to a third embodiment of the invention. Contrary to the rotor blade 10 of FIG. 2, the fluid jet module 21 is embedded in the shell 11 of the rotor blade 10.

The fluid jet module 21 has a curved outer shape on its outer side 25 to correspond to the shape of the airfoil or shell 11 of the rotor blade 10. The inner side 26 corresponds in form to a recessed shape of a recess inside 12 of the shell 11 of the rotor blade 10 for form-fitting therewith. The fluid jet module 21 has an elongate body comprising a fluid flow channel 24 fluidically connected to the compressed fluid source 22 and the fluid jets 23.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A lift modifying device for a rotor blade of a wind turbine, the lifting modifying device comprising:
    at least one fluid jet module attached to an outer surface of the rotor blade so that the at least one fluid jet module projects upward from the outer surface of the blade, and at least one compressed fluid source, wherein the at least one fluid jet module comprises multiple fluid jets which are fluidically connected to the at least one compressed fluid source, the at least one fluid jet module is configured to be arranged at a suction side or a pressure side of an airfoil of the rotor blade, and the at least one fluid jet module is configured to generate a fluid curtain separating an air flow on the suction side or the pressure side of the airfoil, when the rotor blade is provided with the lift modifying device on the suction side or the pressure side and the at least one compressed fluid source supplies compressed fluid to the at least one fluid jet module;
    wherein the at least one fluid jet module is at least two fluid jet modules, further wherein each of the at least two fluid jet modules comprises multiple fluid jets, each of the at least two fluid jet modules is connected by a separate fluid supply line to the at least one compressed fluid source, and each separate fluid line has a valve arranged therein.

2. The lift modifying device according to claim 1, wherein the at least one compressed fluid source is a compressed air source.

3. The lift modifying device according to claim 1, wherein the multiple fluid jets in the at least one fluid jet module are provided as orifices fluidically connected to the at least one compressed fluid source.

4. The lift modifying device according to claim 1, wherein the at least one fluid jet module comprises an elongate body forming a fluid flow channel fluidically communicating with the multiple fluid jets.

5. The lift modifying device according to claim 1, wherein each of the at least two fluid jet modules are connected to the at least one compressed fluid source by the valve and/or each of the at least two fluid jet modules is connected to a separate one of the at least one compressed fluid source.

6. The lift modifying device according to claim 1, further comprising a control unit connected to the at least one compressed fluid source or the valve of each separate fluid line arranged in between the at least one fluid jet module and the at least one compressed fluid source, wherein the control unit is configured for varying a momentum of compressed fluid exiting the multiple fluid jets by controlling the at least one compressed fluid source or the valve.

7. The lift modifying device according to claim 6, wherein the control unit is configured to operate the at least one compressed fluid source and/or alternatingly open and close the valve such that the compressed fluid exits the multiple fluid jets as compressed fluid pulses.

\* \* \* \* \*